United States Patent
Wu et al.

(10) Patent No.: US 9,423,799 B1
(45) Date of Patent: Aug. 23, 2016

(54) OPTIMUM STRATEGIES FOR SELECTING DESCENT FLIGHT-PATH ANGLES

(71) Applicant: The United States of America as Represented by the Administrator of the National Aeronautics & Space Administration (NASA), Washington, DC (US)

(72) Inventors: Minghong G. Wu, Sunnyvale, CA (US); Steven M. Green

(73) Assignee: The United States of America as Represented by the Administrator of the National Aeronautics and Space Administration (NASA), Washington, DC (US)

(*) Notice: Subject to any disclaimer, the term of this patent is extended or adjusted under 35 U.S.C. 154(b) by 12 days.

(21) Appl. No.: 14/456,917

(22) Filed: Aug. 11, 2014

Related U.S. Application Data

(60) Provisional application No. 61/864,779, filed on Aug. 12, 2013.

(51) Int. Cl.
*G05D 1/04* (2006.01)
*G05D 1/06* (2006.01)
*G08G 5/00* (2006.01)

(52) U.S. Cl.
CPC ............ *G05D 1/042* (2013.01); *G05D 1/0607* (2013.01); *G08G 5/0004* (2013.01); *G08G 5/0047* (2013.01)

(58) Field of Classification Search
CPC ............. G05D 1/0653; G05D 1/0055; G05D 1/0676; G08G 5/0039; G08G 5/0021; G08G 5/0025; G08G 5/0034; G08G 5/0095; G01C 21/00; G01D 1/0061; B64D 45/04

USPC ........ 701/3, 4, 5, 10, 16, 18, 120, 467, 528, 701/532
See application file for complete search history.

(56) References Cited

U.S. PATENT DOCUMENTS

| | | | |
|---|---|---|---|
| 4,792,906 A * | 12/1988 | King ................... | G05D 1/0653 244/186 |
| 8,224,505 B2 * | 7/2012 | Botargues ............ | G05D 1/0055 244/180 |

(Continued)

OTHER PUBLICATIONS

Nikoleris, Tasos, et al., Queueing Models for Trajectory-Based Aircraft Operations, Transportation Science, pp. 1-11, ISSN 1526-5447, Apr. 5, 2012.

(Continued)

*Primary Examiner* — Yuri Kan
(74) *Attorney, Agent, or Firm* — Christopher J. Menke; Robert M. Padilla; John F. Schipper

(57) ABSTRACT

An information processing system and method for adaptively selecting an aircraft descent flight path for an aircraft, are provided. The system receives flight adaptation parameters, including aircraft flight descent time period, aircraft flight descent airspace region, and aircraft flight descent flyability constraints. The system queries a plurality of flight data sources and retrieves flight information including any of winds and temperatures aloft data, airspace/navigation constraints, airspace traffic demand, and airspace arrival delay model. The system calculates a set of candidate descent profiles, each defined by at least one of a flight path angle and a descent rate, and each including an aggregated total fuel consumption value for the aircraft following a calculated trajectory, and a flyability constraints metric for the calculated trajectory. The system selects a best candidate descent profile having the least fuel consumption value while the flyability constraints metric remains within aircraft flight descent flyability constraints.

20 Claims, 7 Drawing Sheets

(56) References Cited

U.S. PATENT DOCUMENTS

| | | | | |
|---|---|---|---|---|
| 2006/0200279 | A1* | 9/2006 | Ainsworth | G08G 5/025 701/16 |
| 2011/0137495 | A1* | 6/2011 | Sacle | G05D 1/0676 701/3 |
| 2011/0172914 | A1* | 7/2011 | Coulmeau | G08G 5/0034 701/532 |
| 2012/0010806 | A1* | 1/2012 | Tseng | G01C 21/00 701/528 |
| 2013/0085669 | A1* | 4/2013 | Bailey | G08G 5/0039 701/467 |
| 2013/0103233 | A1* | 4/2013 | Bourret | B64D 45/04 701/18 |
| 2013/0211632 | A1* | 8/2013 | Caule | G05D 1/0061 701/3 |
| 2014/0018980 | A1* | 1/2014 | Bollapragada | G08G 5/0021 701/10 |
| 2015/0235559 | A1* | 8/2015 | Alekseev | G08G 5/0095 701/120 |

OTHER PUBLICATIONS

Wu, Minghong G., et al., Strategies for Choosing Descent Flight-Path Angles for Small Jets, AIAA Guidance, Navigation, and Control Conference, Minneapolis, Minnesota, pp. 1-26, Aug. 2012.

Wu, Minghong G., et al., Choosing Descent Flight-Path Angles for Small Jets: Case Study for the JFK Airport, AIAA Aviation, Los Angeles, California, pp. 1-18, Aug. 2013.

Slattery, Rhonda et al., Trajectory Synthesis for Air Traffic Automation, Journal of Guidance, Control, and Dynamics, pp. 1-7, Mar./Apr. 1997.

Wu, Minghong G., et al., Analysis of Fixed Flight Path Angle Descents for the Efficient Descent Advisor, NASA/TM-2011-215992, pp. 1-31, Nov. 2011.

Lee, Alan G et al., The Trajectory Synthesizer Generalized Profile Interface, 10th AIAA Aviation Technology, Integration, and Operations Conference, pp. 1-13, Sep. 2010.

* cited by examiner

OPTIMUM STRATEGIES FOR SELECTING DESCENT FLIGHT-PATH ANGLES

CROSS REFERENCE TO RELATED APPLICATION

This application claims the benefit of U.S. Provisional Application No. 61/864,779, filed Aug. 12, 2013, which is hereby incorporated by reference herein in its entirety.

ORIGIN OF INVENTION

The invention described herein was made in the performance of work under a NASA contract and by an employee of the United States Government and is subject to the provisions of Public Law 96-517 (35 U.S.C. §202) and may be manufactured and used by or for the Government for governmental purposes without the payment of any royalties thereon or therefore.

FIELD OF THE INVENTION

The present disclosure generally relates to methods for choosing descent flight path angles for aircraft, and more particularly to a system and method for choosing descent flight path angle for aircraft that plan and execute descents based in kinematic-defined altitude profile (i.e., fixed flight path angle or descent rate).

BACKGROUND

Trajectory management of metered arrivals into high-density terminal airspace is a critical component for Next-Gen Trajectory Based Operations concepts. Significant research has focused on the utilization of modern flight management systems (FMS) to enable continuous descent planning, at least from cruise to a metering fix within the Terminal Radar Approach Control Facilities (TRACON) airspace in the United States or the Terminal Control airspace in other countries. Field trials over the past two decades have provided a great deal of insight into the ability to predict and execute such continuous descents for major-carrier type aircraft such as Boeing and Airbus. However, little attention has been paid to "small" (regional, business and light) jet types, which comprise a large and potentially high-growth portion of NextGen traffic operations.

Unlike the larger aircraft types, which are equipped with performance-based FMS systems that attempt to optimize the vertical profile with near-idle descents, the smaller jets are equipped with simpler Vertical Navigation (VNAV) capabilities. Descent planning for these types typically involves a fixed-flight path angle (FPA) descent that is either based on a company-programmed default or a pilot-selected value. For example, the "standard operating procedure" of one large regional carrier called for an indicated airspeed of 320 knots for descent, initiated at the cruise Mach number, using a default FPA of −3.8 degrees. This works fine for nominal conditions with light to moderate winds and no Air Traffic Control interruptions to the descent. However, when speed restrictions are issued by controllers for metering and spacing, the nominal descent plan can become inefficient and difficult, if not sometimes impossible, to fly in strong tailwinds. In addition, random observations of regional jet operations and pilot interviews revealed that a large variety of descent-planning techniques are used by pilots, even for the same equipment. These techniques vary in terms of the selection of descent angle, bottom-of-descent planning, and top-of-descent transition. Sometimes they take into account winds aloft and weight, but rarely descent speed. It is important to develop and standardize the procedures for establishing efficient descent FPAs for small jets. Such standardized procedures lead to better trajectory predictability and provide benefits for separation assurance. However, selecting the FPA is a non-trivial task, as the most fuel-efficient and "flyable" FPAs can vary significantly as a function of aircraft type, weight, speed profile, and, particularly, winds and wind gradient. The systematic effect of these variables on the selection of fuel-efficient and flyable FPAs is far from understood, and only a limited analysis of fixed-FPA descents exists in the literature. Under some conditions, a steep descent may be the most fuel efficient and yet be operationally unacceptable to pilots. Even if a steep descent is achievable with the utilization of speed brakes, many pilots are reluctant, if not unwilling, to use them because of noise and ride discomfort. Given the significant variation in the winds aloft from one area of the National Airspace System (NAS) of the United States to another, and from one day, week or month to another, the present inventors suggest that the FPA procedure may need to be "adaptive".

In the United States, the Traffic Management Advisor (TMA) computes metering-fix scheduled times of arrival (STA) at the TRACON boundary in order to control throughput of en-route traffic arriving at a high-density airport. The Efficient Descent Advisor (EDA), which was developed to assist en-route controllers in achieving TMA's STAs while maintaining separation, computes clearance advisories that also enable fuel-efficient continuous descent arrivals (CDA). Consider an arrival that is guided by a controller using EDA to plan and execute a continuous descent in order to cross a TRACON metering fix at the STA specified by TMA. During periods of congestion, this STA will result in a small delay at the metering fix to keep the TRACON arrival traffic manageable. Depending on the conditions for each aircraft, speed reductions are typically able to absorb three to four minutes of delay for flights about 20 minutes or 150 nmi from the metering fix. The previous development and testing of EDA focused primarily on descent procedures for large jets equipped with a performance-based FMS. While a simple, fixed-FPA descent procedure using prescribed clearances has been known, EDA itself still lacks a defined descent procedure and corresponding algorithm for defining the descent FPA for small jets.

SUMMARY OF THE INVENTION

According to one embodiment, a method, with a processor of an information processing system, for adaptively selecting an aircraft descent flight path for a particular aircraft that executes descents based on a kinematic-defined descent altitude profile including a descent fixed-flight-path angle, is provided. The method comprises: receiving user input comprising a set of flight adaptation parameters for the particular aircraft, the set of flight adaptation parameters comprising: aircraft flight descent time period; aircraft flight descent airspace region; and aircraft flight descent flyability constraints; querying a flight data source, based at least on the received set of flight adaptation parameters, and retrieving flight information therefrom including any of the following: winds and temperatures aloft data for the aircraft flight descent time period and the aircraft flight descent airspace region; airspace/navigation constraints for the aircraft flight descent time period and the aircraft flight descent airspace region; aircraft performance model for the particular aircraft, including the rate of fuel consumption as a function of aircraft flight velocity and acceleration; an airspace traffic demand corresponding to the aircraft flight descent time period and the aircraft flight descent airspace region; and an airspace arrival delay model corresponding to the aircraft flight descent time period and the aircraft flight descent airspace region; and calculating and constructing a set of candidate descent profiles, based on the retrieved flight information and the set of flight adaptation parameters, where for each candidate in the set of candidate descent profiles constructing a four dimensional trajectory, including position, altitude, and time, for the particular aircraft, the aircraft flight descent time period, and the aircraft flight descent airspace region. Each candidate descent profile comprises: a descent profile value defined by at least one of a flight path angle and a descent rate for the particular aircraft, the descent profile value being within a range of values from a minimum descent profile value to a maximum descent profile value, in defined descent profile value increments. Each candidate descent profile includes an aggregated total fuel consumption value for the particular aircraft following the calculated trajectory for the candidate descent profile, based on the aircraft performance model for the particular aircraft and the descent profile value for the candidate descent profile, and a flyability constraints metric for the calculated trajectory for the candidate descent profile. The method comprises: selecting a best candidate descent profile from the set of candidate descent profiles, the best candidate descent profile having the least fuel consumption value while the flyability constraints metric for the descent profile remains within the aircraft flight descent flyability constraints.

According to another embodiment, a descent flight path planning information processing system is provided. The system comprises: memory storing computer instructions; non-volatile storage; a user input interface; a user output interface; a processor, communicatively coupled with the memory, the non-volatile storage, the user input interface, and the user output interface; a descent flight path selector, communicatively coupled with the processor, wherein the processor, responsive to executing the computer instructions, performs operations comprising: receiving, from the user input interface, user input comprising a set of flight adaptation parameters for a particular aircraft that executes descents based on a kinematic-defined descent altitude profile including a descent fixed-flight-path angle, the set of flight adaptation parameters comprising: aircraft flight descent time period; aircraft flight descent airspace region; and aircraft flight descent flyability constraints; querying a flight data source, based at least on the received set of flight adaptation parameters for aircraft flight descent time period and aircraft flight descent airspace region, and retrieving flight information therefrom including any of the following: winds and temperatures aloft data for the aircraft flight descent time period and the aircraft flight descent airspace region; airspace/navigation constraints for the aircraft flight descent time period and the aircraft flight descent airspace region; aircraft performance model for the particular aircraft, including the rate of fuel consumption as a function of aircraft flight velocity and acceleration; airspace traffic demand corresponding to the aircraft flight descent time period and the aircraft flight descent airspace region; and airspace arrival delay model corresponding to the aircraft flight descent time period and the aircraft flight descent airspace region; and calculating and constructing a set of candidate descent profiles, based on the retrieved flight information and the set of flight adaptation parameters, where for each candidate in the set of candidate descent profiles constructing a four dimensional trajectory, defined by position, altitude, and time, for the particular aircraft, the aircraft flight descent time period, and the aircraft flight descent airspace region, each candidate descent profile comprising: a descent profile value defined by at least one of a flight path angle and a descent rate for the particular aircraft, the descent profile value being within a range of values from a minimum descent profile value to a maximum descent profile value, in defined descent profile value increments; an aggregated total fuel consumption value for the particular aircraft following the calculated trajectory for the candidate descent profile, based on the aircraft performance model for the particular aircraft and the descent profile value for the candidate descent profile; and a flyability constraints metric for the calculated trajectory for the candidate descent profile; selecting a best candidate descent profile from the set of candidate descent profiles, the best candidate descent profile having the least fuel consumption value while the flyability constraints metric for the descent profile remains within the aircraft flight descent flyability constraints; and presenting a representation of the selected best candidate descent profile at the user output interface.

According to another embodiment, a method, with a processor of an information processing system, for adaptively selecting an aircraft descent flight path for a particular aircraft that executes descents based on a kinematic-defined descent altitude profile including a descent fixed-flight-path angle, is provided. The method comprises: receiving a set of flight adaptation parameters for the particular aircraft, the set of flight adaptation parameters comprising: aircraft flight descent time period; aircraft flight descent airspace region; and aircraft flight descent flyability constraints; querying a flight data source, based at least on the received set of flight adaptation parameters for the aircraft flight descent time period and aircraft flight descent airspace region, and retrieving flight information therefrom including any of the following: winds and temperatures aloft data for the aircraft flight descent time period and the aircraft flight descent airspace region; airspace/navigation constraints for the aircraft flight descent time period and the aircraft flight descent airspace region; airspace traffic demand corresponding to the aircraft flight descent time period and the aircraft flight descent airspace region; and airspace arrival delay model corresponding to the aircraft flight descent time period and the aircraft flight descent airspace region; and calculating and constructing a set of candidate descent profiles, based on the retrieved flight information and the set of flight adaptation parameters, where for each candidate in the set of candidate descent profiles constructing a four dimensional trajectory defined by position, altitude, and time, for the particular aircraft, the aircraft flight descent time period, and the aircraft flight descent airspace region, each candidate descent profile comprising: a descent profile value defined by at least one of a flight path angle and a descent rate for the particular aircraft, the descent profile value being within a range of values from a minimum descent profile value to a maximum descent profile value; an aggregated total fuel consumption value for the particular aircraft following the calculated trajectory for the candidate descent profile, based on an aircraft performance model for the particular aircraft and the descent profile value for the candidate descent profile; and a flyability constraints metric for the calculated trajectory for the candidate descent profile; and selecting a best candidate descent profile from the set of candidate descent profiles, the best candidate descent profile having the least fuel consumption value while the flyability constraints metric for the descent profile remains within the aircraft flight descent flyability constraints.

BRIEF DESCRIPTION OF THE DRAWINGS

The accompanying figures in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
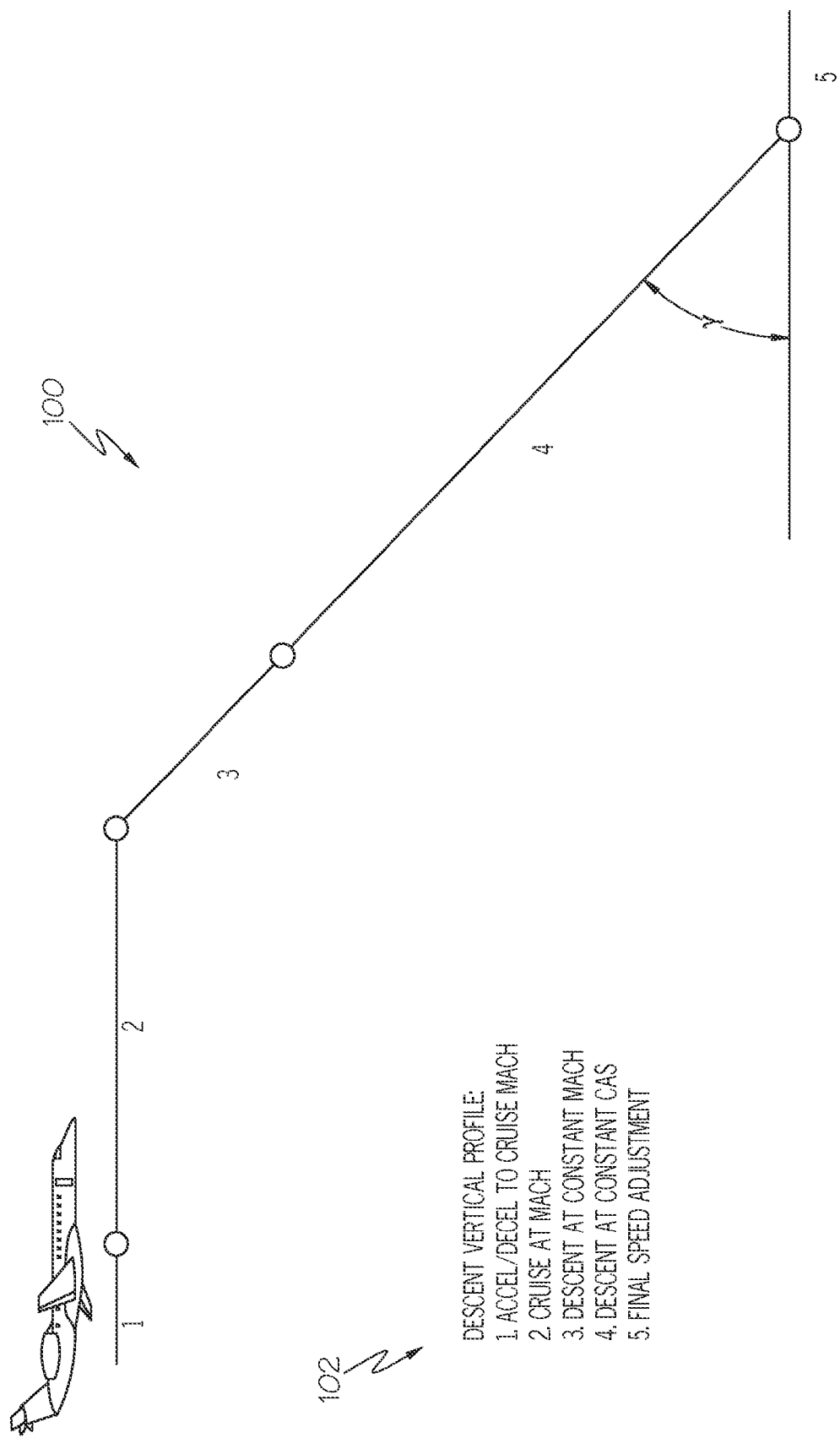
FIG. 1 is a diagram showing an example of an aircraft flight descent vertical profile, according to the present disclosure.

As required, detailed embodiments are disclosed herein; however, it is to be understood that the disclosed embodiments are merely examples and that the devices, systems and methods described herein can be embodied in various forms. Therefore, specific structural and functional details disclosed herein are not to be interpreted as limiting, but merely as a basis for the claims and as a representative basis for teaching one of ordinary skill in the art to variously employ the disclosed subject matter in virtually any appropriately detailed structure and function. Further, the terms and phrases used herein are not intended to be limiting, but rather, to provide an understandable description. Additionally, unless otherwise specifically expressed or clearly understood from the context of use, a term as used herein describes the singular or the plural of that term.

The terms "a" or "an", as used herein, are defined as one or more than one. The term "plurality", as used herein, is defined as two or more than two. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The term "communicatively coupled" or "communicatively coupling" includes, but is not limited to, communicating electronic control signals by which one element may direct or control another. The term "configured to" describes hardware, software or a combination of hardware and software that is adapted to, set up, arranged, commanded, altered, modified, built, composed, constructed, designed, or that has any combination of these characteristics to carry out a given function. The term "adapted to" describes hardware, software or a combination of hardware and software that is capable of, able to accommodate, to make, or that is suitable to carry out a given function.

The terms "controller", "computer", "server", "client", "computer system", "computing system", "personal computing system", or "processing system" describe examples of a suitably configured processing system adapted to implement one or more embodiments of the present disclosure. Any suitably configured processing system is similarly able to be used by embodiments of the present disclosure. A processing system may include one or more processing systems or processors. A processing system can be realized in a centralized fashion in one processing system or in a distributed fashion where different elements are spread across several interconnected processing systems.

The terms "computing system", "computer system", and "personal computing system", describe a processing system that includes a user interface and which is suitably configured and adapted to implement one or more embodiments of the present disclosure. The terms "network", "computer network", "computing network", and "communication network", describe examples of a collection of computers and devices interconnected by communications channels that facilitate communications among users and allows users to share resources. The terms "wireless network", "wireless communication network", and "wireless communication system", similarly describe a network and system that communicatively couples computers and devices primarily or entirely by wireless communication media. The terms "wired network" and "wired communication network" similarly describe a network that communicatively couples computers and devices primarily or entirely by wired communication media.

Strategies for computing the descent profile of an aircraft descent flight path are applicable not only to arrivals into major airports, but also to flights arriving into uncongested ("outstation") airports where Air Traffic Control does not constrain the aircraft's descent speed for traffic control. More fuel can be saved in most cases by carefully planning the descent profile of flights into both the major airports and outstations. Various embodiments of the present disclosure are directed to such careful planning using available flight related information to better plan and manage fuel consumption for an aircraft flight or for a group of aircraft flights. Additional information regarding strategies for choosing descent flight path angles for small jets may be found in the following two listed references: 1) WU, MINGHONG G., et al., Strategies for Choosing Descent Flight-Path Angles for Small Jets, AIAA Guidance, Navigation, and Control Conference, Minneapolis, Minn., pp 1-26, August 2012; and 2) WU, MINGHONG G., et al., Choosing Descent Flight-Path Angles for Small Jets: Case Study for the JFK Airport, AIAA Aviation, Los Angeles, Calif., pp 1-18, August 2013; the collective teaching of the above-identified two references being hereby incorporated by reference in its entirety.

Referring to FIG. 1, an example of an aircraft flight descent vertical profile 100 is shown. The descent vertical profile is characterized by several flight path segments numbered 1 to 5 and identified by the legend 102 as shown. In segment 1, the aircraft accelerates/decelerates to cruise at a desired Mach speed. In segment 2, the aircraft reaches the desired cruise speed. In segment 3, the aircraft begins descent at constant Mach speed. In segment 4, the aircraft continues its descent flight path at a constant calibrated airspeed. A planned descent flight path angle is shown relative to segment 4. In segment 5, the aircraft performs final speed adjustment(s) following a flight path for landing the aircraft.

Figure 2:
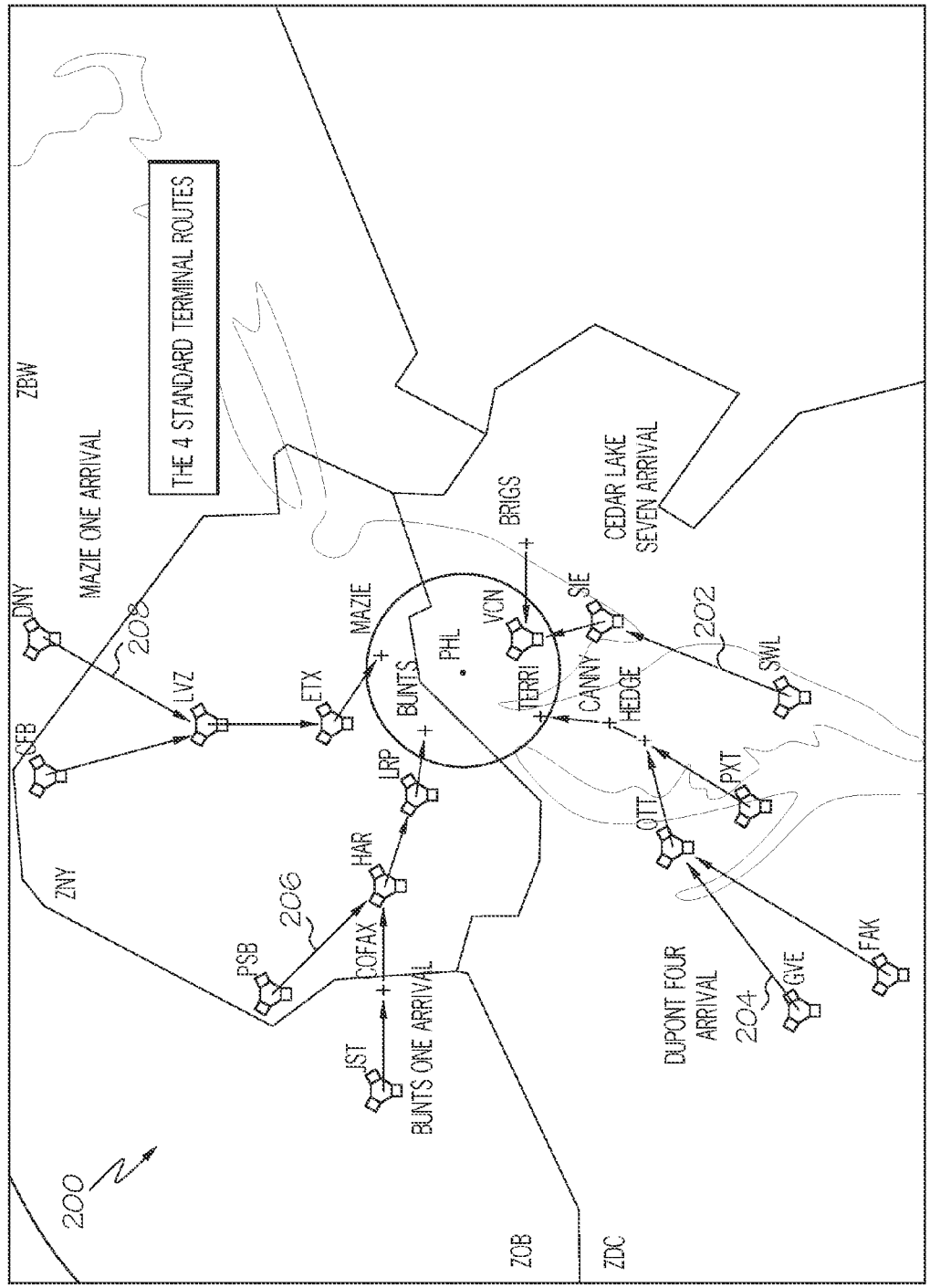
FIG. 2 is an example map of the Dallas Fort Worth airport flight paths over a certain time, according to the present disclosure.

Flight paths typically follow defined regions of airspace as illustrated in FIG. 2. The map 200 shown in FIG. 2 illustrates an example of various flight paths defined by arrival procedures to the Philadelphia PHL airport. As can be seen in FIG. 2, a first defined flight path 202 follows an airspace region named "CEDAR LAKE SEVEN ARRIVAL". A second defined flight path 204 follows an airspace region named "DUPONT FOUR ARRIVAL". A third defined flight path 206 follows an airspace region named "BUNTS ONE ARRIVAL". Lastly, a fourth defined flight path 208 follows an airspace region named "MAZIE ONE ARRIVAL".

Each of these aircraft flight descent paths can be defined by a four dimensional trajectory. The trajectory is defined by including XY positioning as illustrated in FIG. 2, Z vertical positioning as illustrated in FIG. 1, and a time duration for each measured segment of the flight trajectory from a starting point to an ending point during the aircraft flight descent trajectory.

Figure 3:
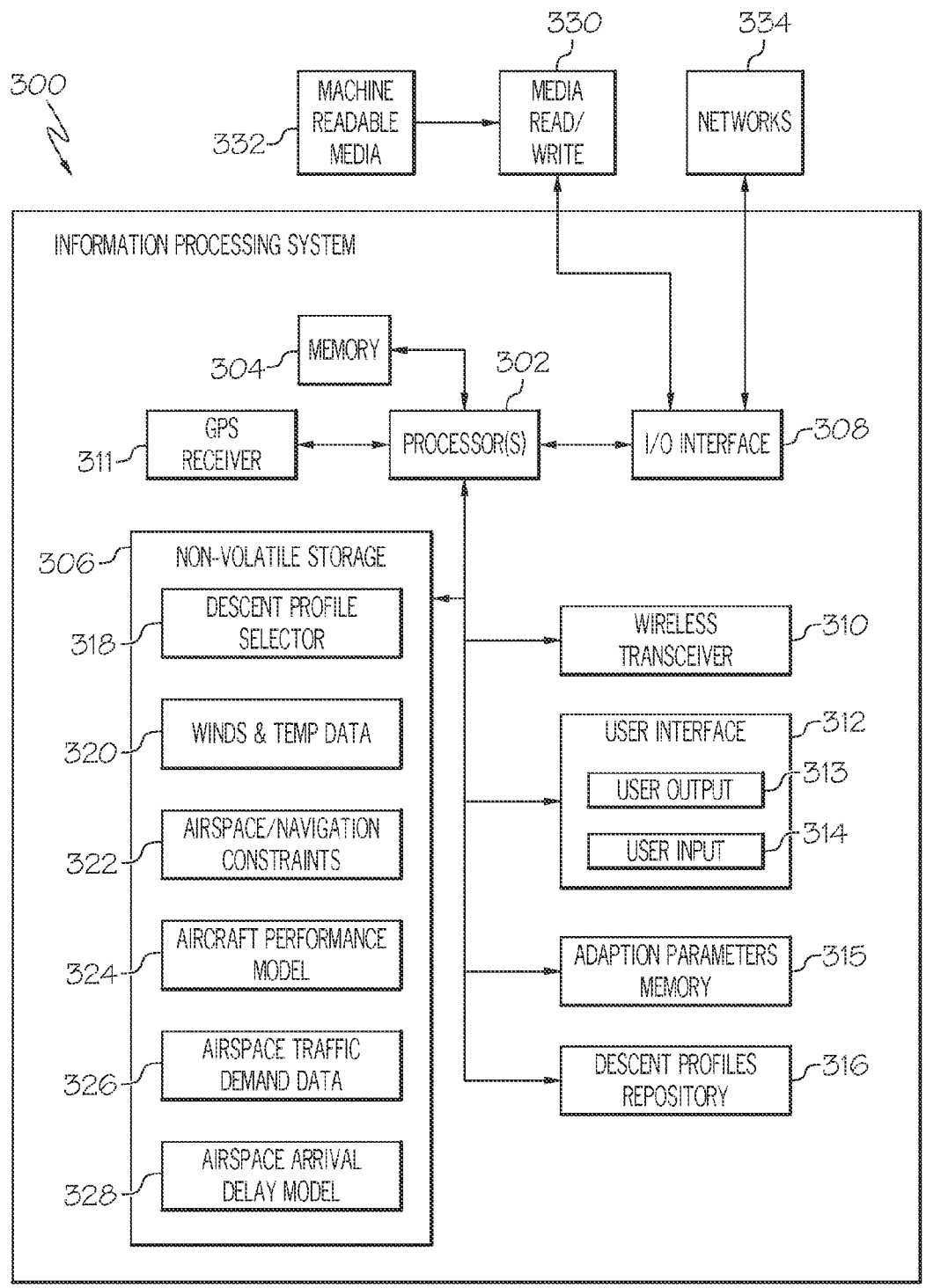
FIG. 3 is a functional block diagram of an example of an information processing system, according to the present disclosure.

Referring to FIG. 3, an example of an information processing system 300 is shown. The information processing system 300 includes at least one processor 302 that is communicatively coupled with memory 304 and non-volatile storage 306. The processor 302 interoperates with computer instructions stored in the memory 304 and/or the non-volatile storage 306 to perform operations of the information processing system 300.

The non-volatile storage 306, according to the present example, stores instructions for a descent profile selector 318 which interoperates with the processor 302 to provide certain methods according to various embodiments of the present disclosure. These certain methods will be discussed in more detail below.

The non-volatile storage 306 stores flight information corresponding to several data sources, including winds and temperature aloft data 320, airspace navigation constraints 322, aircraft performance model 324 for at least one particular aircraft, and airspace traffic demand data 326.

In certain information processing system configurations and associated methods for calculating descent profiles, the non-volatile storage 306 stores flight information corresponding to an airspace arrival delay model 328. This arrival delay model is particularly useful for computing a descent profile for flights into a (congested) major airport. Optionally, arrival delay can be estimated from airspace navigation constraints 322 and from airspace traffic demand data 326. For example, if twenty arrival flights are scheduled to follow the CEDAR LAKE SEVEN ARRIVAL defined flight path 202 to enter a gate of PHL airport within an hour's timespan, while the CEDAR LAKE SEVEN ARRIVAL defined flight path 202 allows maximum twelve flights an hour, then delays would be expected for some of the trailing flights.

In certain system configurations and associated methods for calculating descent profiles, the stored flight information corresponding to an airspace arrival delay model 328 may be replaced and/or supplemented by flight information corresponding to airlines' preferences data (not shown in FIG. 3). If computing the descent profile for flights into uncongested airports (e.g., outstations) experiencing no delays, then typically no delay model would be used in this case. Examples of airlines' preferences may include flight information corresponding to preferred descent speed and/or a preferred cost index for fuel consumption.

A more detailed description of the various types of flight information used by the information processing system 300 and how they are used by the descent profile selector 318 will be discussed below.

The processor 302 is communicatively coupled with a descent profiles repository 316. The descent profiles repository 316 can provide temporary storage or permanent storage of information associated with descent profiles for descent flight path(s). One or more descent profiles can be stored in the descent profiles repository 316. A more detailed description of the descent profiles repository 316 and how it is used by the descent profiles selector 318 will be discussed below.

The processor 302 is communicatively coupled with the adaptation parameters memory 315. The adaptation parameters memory 315 stores adaptation parameters received by the information processing system 300. According to one example embodiment, various adaptation parameters are received by the information processing system 300 from user input from a user of the system 300. The adaptation parameters according to various embodiments are associated with a particular aircraft that is a subject of a method performed by the information processing system 300 for selecting a descent profile for the particular aircraft.

A user interface 312 is communicatively coupled with the processor 302. The user interface 312 includes a user output interface 313 and a user input interface 314. The user output interface 313 includes, according to the present example, a display, and an audio output interface such as one or more speakers, and various indicators such as visual indicators, audible indicators, and haptic indicators. The user output interface 313 may include, according to various examples, a printer that can print hardcopy tangible output documents. A user input interface 314 includes, according to the present example, a keyboard, a mouse or other cursor navigation module such as a touch screen, touch pad, a pen input interface, and a microphone for input of audible signals such as user speech, data and commands that can be recognized by the processor 302.

According to certain embodiments, a wireless transceiver 310 is communicatively coupled with the processor 302. The wireless transceiver 310 can communicate with a wireless communication network (not shown in FIG. 3). The processor 302 using the wireless transceiver 310 can send and receive messages via the wireless communication network.

An I/O interface 308 is communicatively coupled with the processor 302. The processor 302 via the I/O interface 308 can communicate with communication networks 334, which may include wired and/or wireless communication networks. These networks may comprise local area networks, wide area networks, or a combination of local area networks and wide area networks.

A computer media reader/writer 330 is communicatively coupled with the I/O interface 308 according to the present example. Machine readable media 332, such as computer readable storage media, can be communicatively coupled with the media reader/writer 330. In this way, the processor 302 can interoperate with the media reader/writer 330 to read data or instructions from the machine readable media 332 and/or to write data or instructions to the machine readable media 332.

A GPS receiver 311, in certain embodiments, is communicatively coupled with the processor 302. The processor 302 can receive location information from the GPS receiver 311. The location information can be used by the processor 302 to determine a location associated with the information processing system 300. In the event that the information processing system 300 is moving, the information processing system 300 can use the received GPS location information to determine a geospatial location associated with the information processing system 300. For example, according to an embodiment of the present disclosure, the information processing system 300 may be operating in an aircraft for which a descent profile is being planned real time while the aircraft is flying a flight path approaching a destination airport. The information processing system 300 can use the received GPS location information over time to track the flight path being followed by the aircraft, and to correspond real-time the flight path to a descent profile calculated and displayed via the user output interface 313 to a user of the information processing system 300. The user may be a member of the flight crew in the aircraft. In this way, according to one example embodiment, the information processing system 300 can output signals to the user, such as display symbols and/or colors on a display screen, to indicate to the user whether the aircraft is following the descent profile that was selected for the descent flight path into the destination airport. For example, green color may indicate that the flight path meets the selected descent profile, while a red color could indicate that the flight path fails to meet the selected descent profile. This is only one example scenario. In view of the discussions and teachings herein, it is appreciated that many other applications are contemplated for the new and novel information processing system 300 and associated methods for selecting a descent profile for a flight planned for an aircraft.

Figure 4:
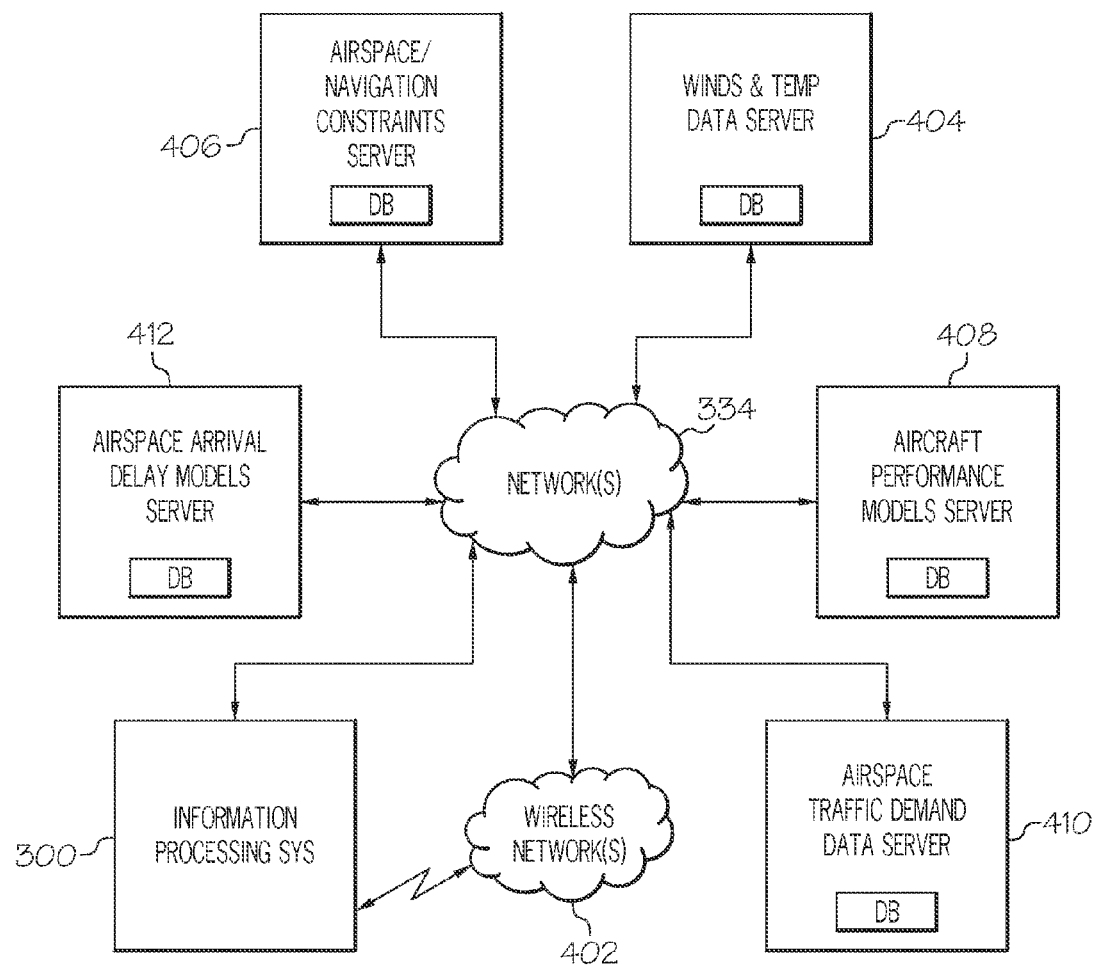
FIG. 4 is a functional block diagram of information processing system of FIG. 3 in an example distributed network environment, according to the present disclosure.

Referring to FIG. 4, one or more networks interconnecting various data sources with the information processing system 300 is show, according to one example. The information processing system 300 is communicatively coupled with the network 334, as has been discussed above with regards to FIG. 3. The information processing system 300 is also shown communicatively coupled with a wireless network 402. The wireless transceiver 310 can communicatively couple the information processing system 300 with the wireless network 402.

A winds and temperature aloft data server 404 is communicatively coupled with the network 334. This server 404 is communicatively coupled with a database that is associated with data source corresponding to winds and temperatures aloft data.

An airspace/navigation constraints server 406 is communicatively coupled with the network 334. This server 406 is communicatively coupled with a database that is associated with a data source corresponding to airspace/navigation constraints.

An aircraft performance models server 408 is communicatively coupled with the network 334. This server 408 is communicatively coupled with a database that is associated with a data source corresponding to aircraft performance models that include a model for the particular aircraft.

An airspace traffic demand data server 410 is communicatively coupled with the network 334. This server 410 is communicatively coupled with a database that is associated with data source corresponding to airspace traffic demand data.

An airspace arrival delay models server 412 is communicatively coupled with the network 334. This server 412 is communicatively coupled with a database that is associated with data source corresponding to airspace arrival delay models.

Figure 5:
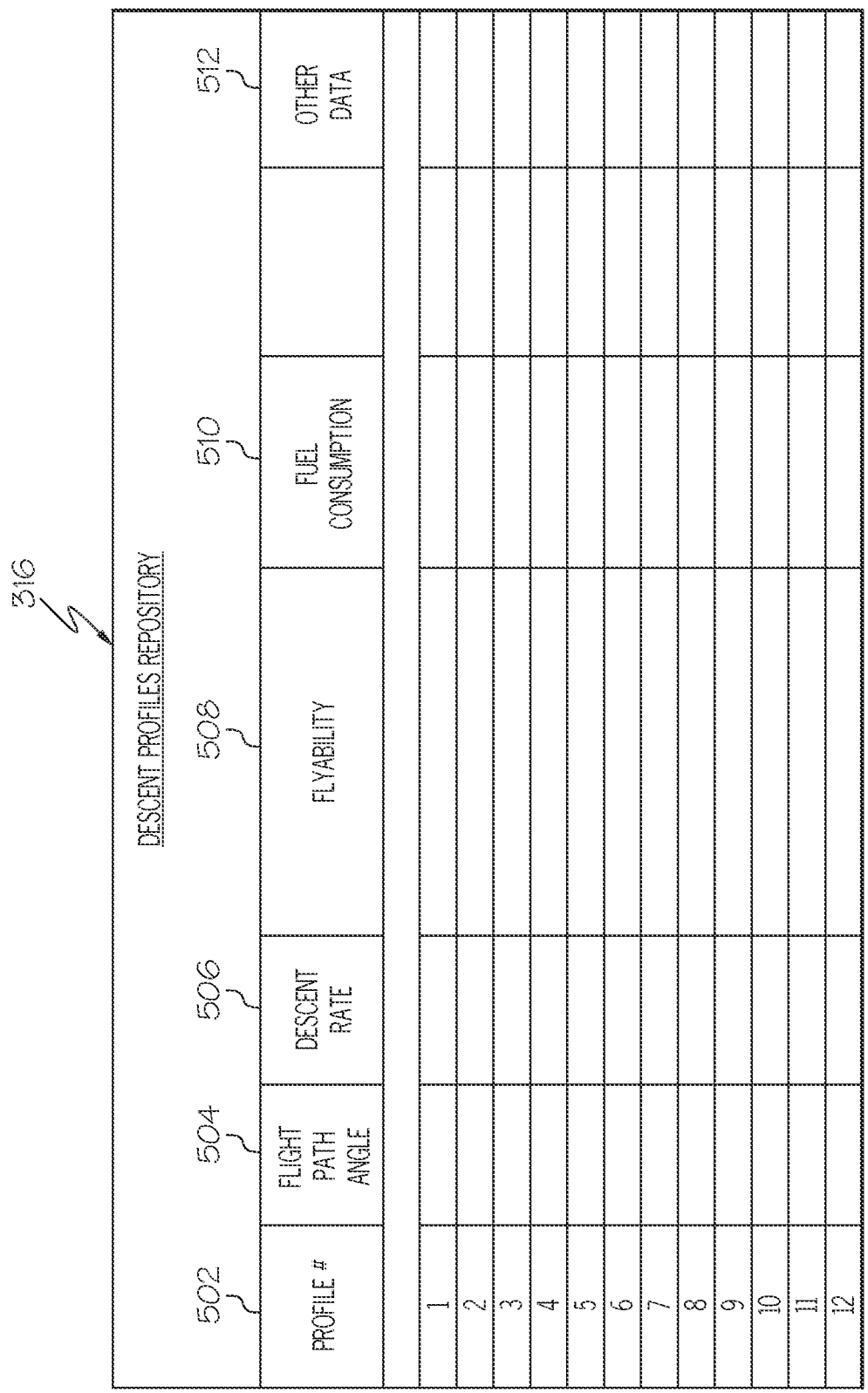
FIG. 5 is a diagram showing a more detailed view of an example of a descent profiles repository as illustrated in FIG. 3, according to the present disclosure.

FIG. 5 illustrates a more detailed view of an example of the descent profiles repository 316 shown in FIG. 3. The descent profiles repository 316 according to the present example can include a set of one or more records containing descent profile information for each candidate descent profile. Twelve such records are shown in FIG. 5. Each row in the illustrated table in the descent profiles repository 316 corresponds to one candidate descent profile. Each descent profile is identified by a descent profile number 502. Each descent profile record, according to the present example, includes a flight path angle 504, a descent rate 506, flyability constraints metric 508 for the trajectory, and a cumulative (aggregated) fuel consumption value 510 aggregated over the calculated trajectory of the particular flight corresponding to the particular descent profile, and may include other data 512.

Figure 6:
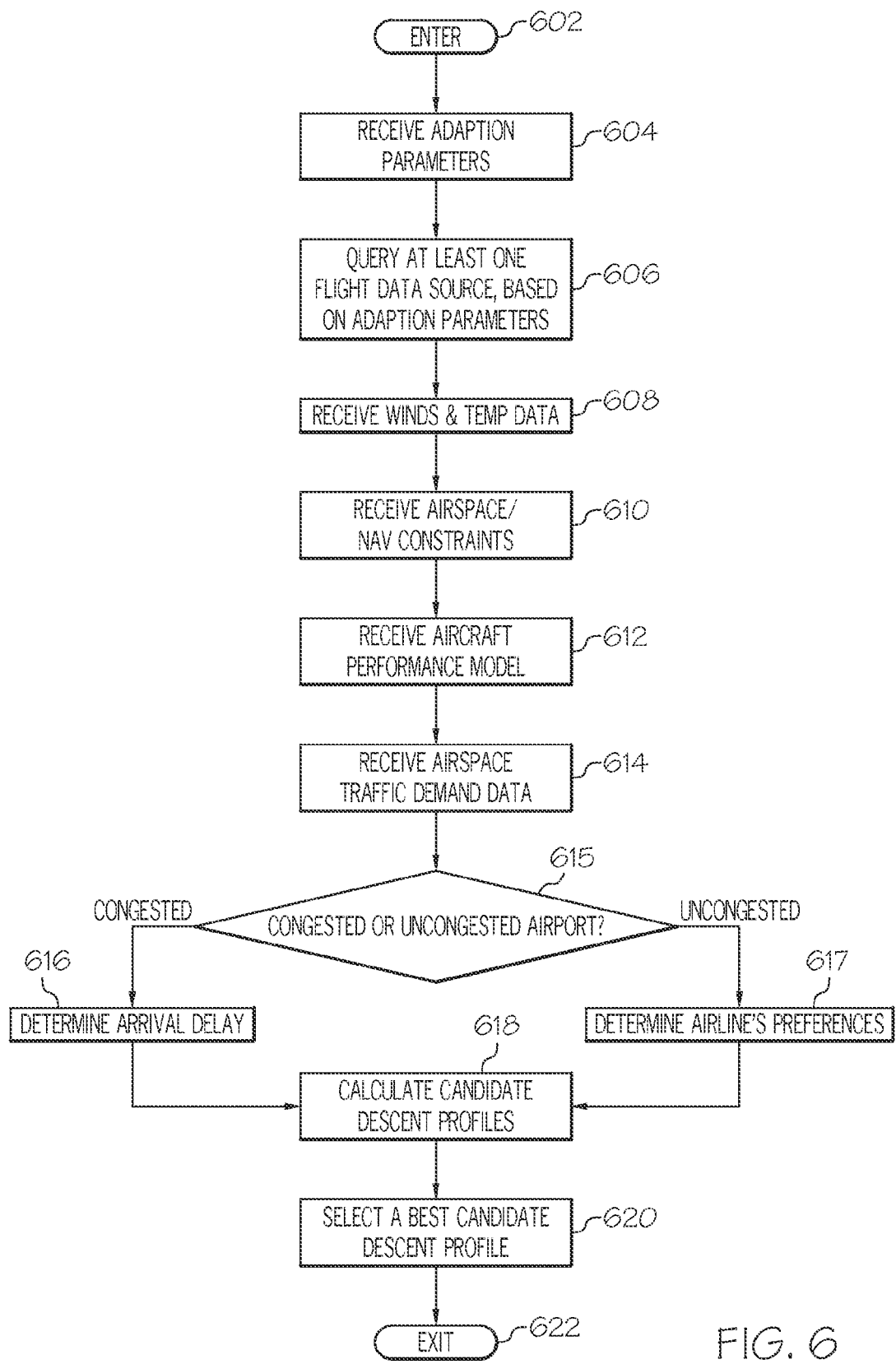
FIG. 6 is an operational flow diagram illustrating an example of an operational sequence performed with the information processing system of FIG. 3, according to the present disclosure.
Figure 7:
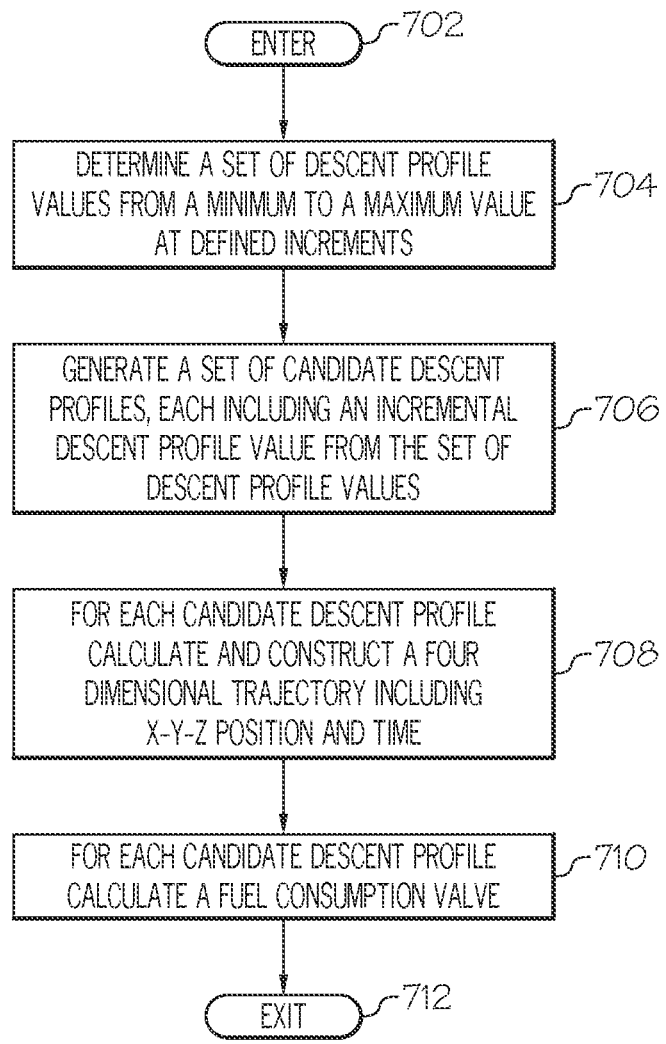
FIG. 7 is an operational flow diagram continuing the illustration of the example of an operational sequence of FIG. 6, according to the present disclosure.

Referring to FIGS. 6 and 7, an operational sequence for the information processing system 300 is illustrated according to one example embodiment of the present disclosure. A processor 302, interoperating with the descent profile selector 318 (e.g., a descent flight path selector), can adaptively select an aircraft descent flight path for a particular aircraft that executes descents based on a kinematic-defined descent altitude profile including a descent fixed-flight-path angle.

The operational sequence is entered by the processor 302, at step 602. The processor 302 receives a set of flight adaptation parameters at step 604, and stores the flight adaptation parameters in the adaptation parameters memory 315. The flight adaptation parameters include, according to the present example, an aircraft flight descent time period, and aircraft flight descent airspace region; and aircraft flight descent flyability constraints. According to various embodiments, the flight adaptation parameters are received as user input via the user input interface. For example, a user can enter the flight adaptation parameters into the information processing system 300 using a keyboard in the user input interface 314. Alternatively, flight adaptation parameters may be received as data provided from a computer readable storage medium. As a third alternative, one or more flight adaptation parameters may be received by the controller 302 from a remotely located information processing system communicating over one or more communication networks 334, 402. The remotely located information processing system may provide a user input interface for receiving user input from remotely located technical personnel who may enter the flight adaptation parameters via the user interface of the remotely located information processing system. These flight adaptation parameters identify the airspace region and period of time. According to one example, the flight adaptation parameters would identify the airspace region named "CEDAR LAKE SEVEN ARRIVAL" (see FIG. 2) arriving at a southeast gate of the PHL airport and identify a flight arrival date, e.g., Aug. 11, 2014, and similarly identify a flight arrival time. The aircraft flight descent flyability constraints may be specified by a user. The aircraft flight descent flyability constraints, according to certain embodiments, comprise at least a speed-brake usage constraint specified for a pilot or crew associated with a particular aircraft and flight.

Based on these adaptation parameters, at step 606, the processor 302, according to the present example, queries at least several flight data sources—i.e. the winds aloft and temperature data 320, the airspace/navigation constraints data 322, the aircraft performance model 324, and the airspace traffic demand data 326. The queries may be made to flight data sources 320, 322, 324, 326, that are local to the information processing system 300. For example, the one or more flight data sources may be stored in the non-volatile storage 306 locally accessible by the processor 302.

Certain queries, such as any of the queries to flight data sources mentioned above, may be alternatively made to one or more remotely located flight data sources, such as flight data sources corresponding to data bases communicatively coupled to remote servers 404, 406, 408, 410, across one or more communication networks 334, 402. For example, the processor 302 may send a query message to a server 404, 406, 408, 410, and 412, as illustrated in FIG. 4, remotely located across one or more networks 334, 402. One or more flight data sources may be associated with flight information stored in databases communicatively coupled with these servers 404, 406, 408, 410, and 412, as illustrated in FIG. 4. A query message, according to certain embodiments, comprises at least one of the received set of flight adaptation parameters for the aircraft flight descent time period and the aircraft flight descent airspace region. The processor 302 may make queries to any combination of local or remotely located flight data sources.

As an example, wind and temperature aloft data can be obtained from a remote server 404 such as from the National Oceanic and Atmospheric Administration server accessible through their web site (http://www.noaa.gov).

As a second specific example, the airspace/navigation constraints data can be obtained from a remote server 406, such as airspace constraints data published by the Federal Aviation Association (FAA) and accessible through their web site, and navigation constraints data that are specified in arrival procedures published by aviation service providers such as from the Jeppesen server accessible through their web site (wwl.jeppesen.com)

As a third specific example, the aircraft performance models data can be obtained from a remote server 408, such as from aircraft manufacturer's manuals or from Base of Aircraft Data (BADA) developed by EUROCONTROL and accessible through their web site (www.eurocontrol.int/services/bada).

As a fourth specific example, the airspace traffic demand data can be obtained from a remote server 410, such as from airlines' published flight schedule (for say, next day, week, or month) and accessible through their respective web sites.

As a fifth specific example, the airspace arrival delay model can be obtained from a remote server 412 and/or can be locally stored in the non-volatile storage 306. One such airspace arrival delay model is disclosed by Nikoleris, Tasos, and Mark Hansen. "Queueing models for trajectory-based aircraft operations." *Transportation Science* 46.4 (2012): 501-511; the teaching of the above-identified reference being hereby incorporated by reference in its entirety. An airspace arrival delay model can be provided as a computer program and data stored in a computer readable storage medium 332 readable by the processor 302.

As a sixth specific example, the airlines' preferences data can be obtained from a remote server 412 and/or can be locally stored in the non-volatile storage 306. Such data are usually proprietary and provided by the airline that is responsible for the particular aircraft and flight. Examples of airlines' preferences may include flight information corresponding to preferred descent speed and/or a preferred cost index for fuel consumption.

The flight data sources respond to the queries by providing flight information to the processor 302. For example, a local flight data sources may perform a local look-up in locally stored flight information in the non-volatile storage 306 and provide the flight information to the processor 302. As another example, a remotely located server 404, 406, 408, 410, and 412, may receive a query message from the information processing system 300, and in response perform a look-up in its associated database and then send a response message to the information processing system 300 across one or more networks 334, 402.

The processor 302, in response to making the queries to the flight data sources, receives and retrieves flight information from the respective flight data sources. As discussed above, winds and temperature aloft data for the aircraft flight descent time period and the aircraft flight descent airspace region can be received and retrieved, at step 608, from a remote server 404 such as from the National Oceanic and Atmospheric Administration server. Similarly, airspace/navigation constraints data for the aircraft flight descent time period and the aircraft flight descent airspace region can be received and retrieved, at step 610, from a remote server 406 such as from the FAA server and the Jeppesen server both accessible through their respective web sites.

Moreover, aircraft performance models data for the particular aircraft can be received and retrieved, at step 612, from a remote server 408, such as from BADA accessible through their web site. Similarly, airspace traffic demand data for the aircraft flight descent time period and the aircraft flight descent airspace region can be received and retrieved, at step 614, from a remote server 410, such as from airlines' published flight schedule (for say, next day, week, or month) and accessible through their respective web sites.

According to the present example, if the destination airport is determined to be a congested major airport, at step 615, airspace arrival delay model for the aircraft flight descent time period and the aircraft flight descent airspace region can be received and retrieved, at step 616, from a remote server 412. Optionally, arrival delay can be estimated from airspace navigation constraints 322 obtained at step 610 and from airspace traffic demand data 326 obtained at step 614.

On the other hand, in the present example, if the destination airport is determined to be an uncongested airport (e.g., outstations), at step 615, airlines' preferences data for the aircraft flight descent time period and the aircraft flight descent airspace region can be received and retrieved, at step 617, from a remote server 412. In such a case, the locally stored flight information corresponding to an airspace arrival delay model 328 may be replaced and/or supplemented by flight information corresponding to airlines' preferences data (not shown in FIG. 3).

The processor 302, at step 618, calculates and constructs a set of candidate descent profiles, based on the retrieved flight information and the set of flight adaptation parameters. The processor 302 saves the cumulative (aggregated) fuel consumption 510 and flyability constraints metric 508 for each trajectory of each flight corresponding to one or more candidate descent profiles as indicated by the rows in the descent profiles repository 316 shown in FIG. 5. According to the present example, the trajectory information of each flight corresponding to each candidate descent profile is not stored in the descent profiles repository 316, and can be stored temporarily in memory 304 and used as necessary during the calculations of the cumulative fuel consumption 510 for each trajectory. This process is discussed in more detail below with reference to FIG. 7. This set of candidate descent profiles (shown as rows in the table of FIG. 5) is stored in the descent profiles repository 316. Each candidate descent profile stored in the repository 316 may include information shown and discussed with reference to FIG. 5. For example, each candidate in the set of candidate descent profiles can include a four dimensional trajectory, including position, altitude, and time, for the particular aircraft, the aircraft flight descent time period, and the aircraft flight descent airspace region. Each candidate can also include a descent profile value defined by at least one of a flight path angle and a descent rate for the particular aircraft, the descent profile value being within a range of values from a minimum descent profile value to a maximum descent profile value, in defined descent profile value increments. Each candidate can also include a calculated aggregated total fuel consumption value for the particular aircraft and the trajectory information of each flight corresponding to each candidate descent profile, based on the aircraft performance model for the particular aircraft and the descent profile value for the candidate descent profile.

The processor 302, at step 620, selects a best candidate descent profile from the set of candidate descent profiles from the descent profiles repository 316. The best candidate descent profile, according to the present example, has the best cumulative (aggregated) total fuel consumption (e.g., the least fuel consumption) over the calculated trajectory of the flight while the (aggregated) flyability constraints metric over the calculated trajectory of the flight descent satisfying the flyability constraints of the flight adaptation parameters. The aircraft flight descent flyability constraints, according to certain embodiments, comprise at least a speed-brake usage constraint specified for a pilot or crew associated with a particular aircraft and flight. Two potential metrics for flyability are 1) the maximum percentage of speed-brake usage at any point along the descent portion of the trajectory, and 2) the average speed-brake usage along the descent portion of the trajectory. Users can pick a metric and define the flyability threshold that fits their needs in the flight adaptation parameters. The processor 302 then exits the operational sequence at step 622.

The processor 302 may then present a representation of the selected best candidate descent profile at a user output interface 313. For example, a numerical value associated with a flight path angle of the selected best candidate descent profile can be displayed on a display screen associated with the user output interface 313 of the information processing system 300. As another example, a numerical value associated with a flight path angle of the selected best candidate descent profile can be printed by a printing device on tangible print media (e.g., paper) associated with the user output interface 313 of the information processing system 300. Also, a combination of outputs from the user output interface 313 can be provided to a user of the information processing system 300.

FIG. 7 illustrates a more detailed discussion of the example process followed in step 618 for calculating the set of candidate descent profiles. The operational sequence is entered at step 702, and immediately proceeds to step 704. The processor 302, at step 704, determines a set of descent profile values ranging from a minimum to a maximum value. According to certain embodiments, each of the set of descent profile values are spaced at defined increments from each other.

The descent profile value can be either a fixed flight-path angle or a descent rate. According to the present example, the range of the descent profile value is set to cover all possible values that can be dialed in on the avionics in the flight deck of the aircraft. Other constraints such as airspace partition or flyability can limit the selection, and therefore the selected descent profile value is very unlikely to fall outside the range of values supported by any avionics. The increment, according to the present example, is selected to match the highest precision of values that can be dialed in on any avionics. For flight-path angles a typical precision is 0.1 degrees. For descent rates, a typical precision is 100 feet per minute.

The processor 302, at step 706, generates a set of candidate descent profiles. Each candidate descent profile includes an incremental descent profile value from the set of descent profile values.

The processor 302, at step 708, calculates and constructs, for each candidate descent profile, a four dimensional (4D) trajectory including X-Y-Z position and Time, while using the received and retrieved flight information from the data sources. It should be notes that a time delay may be generated from a metering delay model, for metered arrivals, to provide the time information to calculate the four dimensional trajectory.

A trajectory generator application (not shown in FIG. 3) can be utilized by the processor 302 to generate the 4D trajectory as well as the accumulated (aggregated) fuel consumption and speed-brake usage (flyability constraints) over the 4D trajectory. The flyability concerns the fact that pilots may have difficulty flying steep descents and, even if they can fly steep descents with the use of speed brakes, they are generally reluctant to do so on a regular basis. The descent profile selector 318, according to the present example, computes the flyability of each trajectory, using the predicted speed-brake usage along the descent portion of the trajectory. Two potential metrics for flyability are 1) the maximum percentage of speed-brake usage at any point along the descent portion of the trajectory, and 2) the average usage of speed-brake usage along the descent portion of the trajectory. Users can pick a metric and define the flyability threshold that fits their needs. For example, and not for limitation, users can define that 1) a trajectory is flyable if it uses no more than 10% of the speed brake, and 2) 99% of the flights considered must have flyable trajectories for a specific descent profile value.

Any trajectory generator that can compute the fixed flight-path angle and fixed descent rate for trajectories along with aggregated fuel consumption and speed brake usage over the trajectory can be used in the descent profile selector 318. A trajectory generator may be implemented as a special purpose software application that is either part of the descent profile selector 318 or that is accessed by the descent profile selector 318 to calculate the trajectory for each candidate descent profile. One specific example of a trajectory generator is the Trajectory Synthesizer component of the Center-TRACON Automation System. Interested parties can contact the NASA Ames technology partnerships division accessible through their web site (http://www.nasa.gov/ames-partnerships/#.U-Pw8JXkfmE) for more information. See also the following two listed references, which further describe in more detail the use of a trajectory generator that would be compatible for use with the descent profile selector 318, according to the present example.

1) Lee, A. G., Bouyssounouse, X., and Murphy, J. R., "The Trajectory Synthesizer Generalized Profile Interface," Proceedings of the 10th AIAA Aviation Technology, Integration, and Operations Conference, AIAA-2010-9138, September 2010; and 2) Slattery, R. and Zhao, Y., "Trajectory Synthesis for Air Traffic Automation," Journal of Guidance, Control and Dynamics, Vol. 20, No. 2, March 1997, pp. 232-238. The collective teaching of the above-identified two references is hereby incorporated by reference in its entirety.

The processor 302, at step 710, calculates a cumulative (aggregated) fuel consumption value for each candidate descent profile over its flight trajectory. The calculated fuel consumption value for the particular aircraft and flight is based at least on the aircraft performance model for the particular aircraft and on the descent profile value for the candidate descent profile. It should be noted here that the descent profile value with the best fuel consumption (e.g., the least fuel consumption over the trajectory) and that satisfies the flyability constraints over the trajectory will be selected by the descent profile selector 318, at step 620. The processor 302 then exits the operational sequence at step 712.

According to various embodiments, the method discussed above with reference to FIGS. 6 and 7 may be repeated, i.e., the querying, the calculating and constructing, and the selecting, may be repeated at periodic time intervals, thereby selecting a best candidate descent profile over a plurality of time intervals with possible change in any of several relevant operating conditions. That is, the best candidate descent profile is repeatedly calculated over a plurality of time intervals with possible change in any of winds and temperatures aloft data, airspace/navigation constraints, airspace traffic demand, airspace arrival delay model, corresponding to the aircraft flight descent time period and the aircraft flight descent airspace region. The best overall candidate descent profile can be selected from a plurality of repeatedly calculated best candidate descent profiles calculated over the plurality of time intervals. The best overall candidate descent profile having the least fuel consumption value of all the calculated best candidate descent profiles while the descent profile value remains within the aircraft flight descent flyability constraints.

According to certain embodiments, the method discussed above with reference to FIGS. 6 and 7 may be repeated, i.e., the querying, the calculating and constructing, and the selecting, may be repeated for a plurality of aircraft flights planned over a defined planning time period, each of the plurality of aircraft flights planned having substantially the same aircraft flight descent time period and aircraft flight descent airspace region, and a selected best candidate descent profile. Then, the plurality of selected best candidate descent profiles for the plurality of aircraft flights planned over the defined planning time period are aggregated. An optimal candidate descent profile can be determined from the aggregated plurality of selected best candidate descent profiles, the optimal candidate descent profile having the least fuel consumption value while the descent profile value remains within the aircraft flight descent flyability constraints.

According to various embodiments, the method discussed above with reference to FIGS. 6 and 7 may be repeated, i.e., the querying, the calculating and constructing, and the selecting, may be repeated for a plurality of aircraft flights planned over a defined planning time period, each of the plurality of aircraft flights planned having substantially the same aircraft flight descent time period and aircraft flight descent airspace region, and a selected best candidate descent profile. Then, the plurality of selected best candidate descent profiles for the plurality of aircraft flights planned over the defined planning time period are aggregated. A plurality of calculated fuel consumption values from the aggregated plurality of selected best candidate descent profiles, respectively, can be accumulated (aggregated) resulting in a total fuel consumption value for the plurality of aircraft flights planned over the defined planning time period.

The present subject matter can be realized in hardware, software, or a combination of hardware and software. A system can be realized in a centralized fashion in one computer system, or in a distributed fashion where different elements are spread across several interconnected computer systems. Any kind of computer system—or other apparatus adapted for carrying out the methods described herein—is suitable.

The present subject matter can also be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may be a computer readable storage medium embodying a tangible non-transitory medium, such as a non-volatile memory, e.g., a read-only memory (ROM), a flash memory, a disk drive memory, a CD-ROM, and other permanent storage. Additionally, a computer readable storage medium may include volatile storage such as RAM, buffers, cache memory, and network circuits. Furthermore, in certain embodiments of the computer readable medium, other than a computer readable storage medium as discussed above, the computer readable medium may comprise computer readable information in a transitory state medium such as a network link and/or a network interface, including a wired network or a wireless network, that allow a computer to read such computer readable information.

Although specific embodiments of the subject matter have been disclosed, those having ordinary skill in the art will understand that changes can be made to the specific embodiments without departing from the scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A method, with a processor of an information processing system, for adaptively selecting an aircraft descent flight path for a particular aircraft that executes descents based on a kinematic-defined descent altitude profile including a descent fixed-flight-path angle, such particular aircraft being unequipped with a performance-based flight management system that calculates and constructs a descent profile that guides a pilot of such particular aircraft through near-idle descents, the method comprising:

receiving user input comprising a set of flight adaptation parameters for the particular aircraft, the set of flight adaptation parameters comprising:
    aircraft flight descent time period;
    aircraft flight descent airspace region; and
    aircraft flight descent flyability constraints;
    querying a plurality of flight data sources, based at least on the received set of flight adaptation parameters, and retrieving flight information therefrom including the following:
    winds and temperatures aloft data for the aircraft flight descent time period and the aircraft flight descent airspace region;

airspace/navigation constraints for the aircraft flight descent time period and the aircraft flight descent airspace region;

aircraft performance model for the particular aircraft, including the rate of fuel consumption as a function of aircraft flight velocity and acceleration; and airspace traffic demand corresponding to the aircraft flight descent time period and the aircraft flight descent airspace region; and calculating and constructing a set of candidate descent profiles, based on the retrieved flight information and the set of flight adaptation parameters, the calculating and constructing performed at a location physically separate from the particular aircraft, where for each candidate in the set of candidate descent profiles constructing a four dimensional trajectory defined by position, altitude, and time, for the particular aircraft descent flight path, the aircraft flight descent time period, and the aircraft flight descent airspace region, each candidate descent profile comprising:

a descent profile value defined by at least one of a flight path angle and a descent rate for the particular aircraft, the descent profile value being within a range of values from a minimum descent profile value to a maximum descent profile value, in defined descent profile value increments;

an aggregated total fuel consumption value for the particular aircraft following the calculated trajectory for the candidate descent profile, based on the aircraft performance model for the particular aircraft and the descent profile value for the candidate descent profile; and a flyability constraints metric for the calculated trajectory for the candidate descent profile; and selecting a best candidate descent profile from the set of candidate descent profiles, the best candidate descent profile having the least fuel consumption value while the flyability constraints metric for the descent profile remains within the aircraft flight descent flyability constraints.

2. The method of claim 1, wherein the aircraft flight descent flyability constraints comprising at least a speed-brake usage constraint.

3. The method of claim 2, wherein the speed-brake usage constraint comprises at least one of:
a threshold for maximum percentage of speed-brake usage at any point along the descent portion of the trajectory; and
a threshold for average speed-brake usage along the descent portion of the trajectory.

4. The method of claim 1, further comprising presenting a representation of the selected best candidate descent profile at a user output interface.

5. The method of claim 4, wherein the presenting comprises printing the representation of the selected best candidate descent profile.

6. The method of claim 1, wherein the querying comprises sending a query message to a server across a network, the server communicatively coupled with a database comprising flight information associated with the at least one flight data source.

7. The method of claim 6, wherein the database includes flight information comprising at least one of:
the winds and temperatures aloft data for the aircraft flight descent time period and the aircraft flight descent airspace region;

the airspace/navigation constraints for the aircraft flight descent time period and the aircraft flight descent airspace region;

the aircraft performance model for the particular aircraft, including the rate of fuel consumption as a function of aircraft flight velocity and acceleration; and the airspace traffic demand corresponding to the aircraft flight descent time period and the aircraft flight descent airspace region.

8. The method of claim 6, wherein the query message comprises at least one of the received set of flight adaptation parameters for the aircraft flight descent time period and the aircraft flight descent airspace region.

9. The method of claim 1, wherein the querying comprises wirelessly sending a query message to a server across a wireless network, the server communicatively coupled with at least one database comprising flight information associated with the at least one flight data source.

10. The method of claim 1, further comprising repeating the querying, the calculating and constructing, and the selecting, at periodic time intervals, thereby selecting a best candidate descent profile over a plurality of time intervals with possible change in any of several relevant operating conditions including winds and temperatures aloft data, airspace/navigation constraints, airspace traffic demand, airspace arrival delay model, corresponding to the aircraft flight descent time period and the aircraft flight descent airspace region.

11. The method of claim 1, further comprising:
repeating the querying, the calculating and constructing, and the selecting, for a plurality of separate aircraft flights, such separate aircraft flights being planned to occur over a defined time period, each of the plurality of separate aircraft flights planned having substantially the same aircraft flight descent time period during a defined set of days and the same aircraft flight descent airspace region, and a selected best candidate descent profile;
aggregating a plurality of selected best candidate descent profiles for the plurality of separate aircraft flights planned over the defined time period; and
selecting an optimal candidate descent profile for the plurality of separate aircraft flights from the aggregated plurality of selected best candidate descent profiles, the optimal candidate descent profile having the least fuel consumption value while the flyability constraints metric of the candidate descent profile remains within the aircraft flight descent flyability constraints.

12. The method of claim 1, further comprising:
repeating the querying, the calculating and constructing, and the selecting, for a plurality of separate aircraft flights, such separate aircraft flights being planned to occur over a defined time period, each of the plurality of separate aircraft flights planned having substantially the same aircraft flight descent time period during a defined set of days, and the same aircraft flight descent airspace region, and a selected best candidate descent profile;
aggregating a plurality of selected best candidate descent profiles for the plurality of separate aircraft flights planned over the defined time period; and
accumulating a plurality of calculated total fuel consumption values from the aggregated plurality of selected best candidate descent profiles, resulting in a total fuel consumption value for the plurality of separate aircraft flights planned over the defined time period.

13. A descent flight path planning information processing system, comprising:
   memory storing computer instructions;
   non-volatile storage;
   a user input interface;
   a user output interface;
   a processor, communicatively coupled with the memory, the non-volatile storage, the user input interface, and the user output interface, the processor being at a location physically separate from a particular aircraft;
   a descent flight path selector, communicatively coupled with the processor, wherein the processor, responsive to executing the computer instructions, performs operations comprising:
   receiving, from the user input interface, user input comprising a set of flight adaptation parameters for the particular aircraft that executes descents based on a kinematic-defined descent altitude profile including a descent fixed-flight-path angle, such particular aircraft being unequipped with a performance-based flight management system that calculates and constructs a descent profile that guides a pilot of such particular aircraft through near-idle descents, the set of flight adaptation parameters comprising:
   aircraft flight descent time period;
   aircraft flight descent airspace region; and
   aircraft flight descent flyability constraints;
   querying a flight data source, based at least on the received set of flight adaptation parameters for aircraft flight descent time period and aircraft flight descent airspace region, and retrieving flight information therefrom including any of the following:
   winds and temperatures aloft data for the aircraft flight descent time period and the aircraft flight descent airspace region;
   airspace/navigation constraints for the aircraft flight descent time period and the aircraft flight descent airspace region;
   aircraft performance model for the particular aircraft, including the rate of fuel consumption as a function of aircraft flight velocity and acceleration;
   airspace traffic demand corresponding to the aircraft flight descent time period and the aircraft flight descent airspace region; and
   airspace arrival delay model corresponding to the aircraft flight descent time period and the aircraft flight descent airspace region; and
   calculating and constructing a set of candidate descent profiles, based on the retrieved flight information and the set of flight adaptation parameters, where for each candidate in the set of candidate descent profiles constructing a four dimensional trajectory defined by position, altitude, and time, for the particular aircraft descent flight path, the aircraft flight descent time period, and the aircraft flight descent airspace region, each candidate descent profile comprising:
   a descent profile value defined by at least one of a flight path angle and a descent rate for the particular aircraft, the descent profile value being within a range of values from a minimum descent profile value to a maximum descent profile value, in defined descent profile value increments; and
   an aggregated total fuel consumption value for the particular aircraft following the calculated trajectory for the candidate descent profile, based on the aircraft performance model for the particular aircraft and the descent profile value for the candidate descent profile; and
   a flyability constraints metric for the calculated trajectory for the candidate descent profile;
   selecting a best candidate descent profile from the set of candidate descent profiles, the best candidate descent profile having the least fuel consumption value while the flyability constraints metric for the descent profile remains within the aircraft flight descent flyability constraints; and presenting a representation of the selected best candidate descent profile at the user output interface.

14. The descent flight path planning information processing system of claim 13, wherein the aircraft flight descent flyability constraints comprising at least one of:
   a threshold for maximum percentage of speed-brake usage at any point along the descent portion of the trajectory; and
   a threshold for average speed-brake usage along the descent portion of the trajectory.

15. The descent flight path planning information processing system of claim 13, wherein the processor, responsive to executing the computer instructions, performs operations comprising sending a query message to a server across a network, the server communicatively coupled with a database comprising flight information associated with the at least one flight data source.

16. The descent flight path planning information processing system of claim 15, wherein the database includes flight information comprising at least one of:
   the winds and temperatures aloft data for the aircraft flight descent time period and the aircraft flight descent airspace region;
   the airspace/navigation constraints for the aircraft flight descent time period and the aircraft flight descent airspace region;
   the aircraft performance model for the particular aircraft, including the rate of fuel consumption as a function of aircraft flight velocity and acceleration;
   the airspace traffic demand corresponding to the aircraft flight descent time period and the aircraft flight descent airspace region;
   the airspace arrival delay model corresponding to the aircraft flight descent time period and the aircraft flight descent airspace region; and
   the airlines' preferences data corresponding to the aircraft flight descent time period and the aircraft flight descent airspace region.

17. The descent flight path planning information processing system of claim 15, wherein the processor, responsive to executing the computer instructions, performs operations comprising sending the query message that comprises at least one of the received set of flight adaptation parameters.

18. The descent flight path planning information processing system of claim 13, wherein the processor, responsive to executing the computer instructions, performs operations comprising:
   repeating the querying, the calculating and constructing, and the selecting, at periodic time intervals, thereby selecting a best candidate descent profile over a plurality of time intervals with possible change in any of several relevant operating conditions including winds and temperatures aloft data, airspace/navigation constraints, airspace traffic demand, airspace arrival delay model, corresponding to the aircraft flight descent time period and the aircraft flight descent airspace region.

19. The descent flight path planning information processing system of claim 13, wherein the processor, responsive to executing the computer instructions, performs operations comprising:

repeating the querying, the calculating and constructing, and the selecting, for a plurality of aircraft flights planned over a defined planning time period, each of the plurality of aircraft flights planned having substantially the same aircraft flight descent time period during a defined set of days and the same aircraft flight descent airspace region, and a selected best candidate descent profile;

aggregating a plurality of selected best candidate descent profiles for the plurality of aircraft flights planned over the defined planning time period; and selecting an optimal candidate descent profile from the aggregated plurality of selected best candidate descent profiles, the optimal candidate descent profile having the least fuel consumption value while the flyability constraints metric of the candidate descent profile remains within the aircraft flight descent flyability constraints; and presenting a representation of the selected optimal candidate descent profile at the user output interface.

20. A method, with a processor of an information processing system, for adaptively selecting an aircraft descent flight path for a particular aircraft that executes descents based on a kinematic-defined descent altitude profile including a descent fixed-flight-path angle, such particular aircraft being unequipped with a performance-based flight management system that calculates and constructs a descent profile that guides a pilot of such particular aircraft through near-idle descents, the method comprising:

receiving a set of flight adaptation parameters for the particular aircraft, the set of flight adaptation parameters comprising:

aircraft flight descent time period;

aircraft flight descent airspace region; and aircraft flight descent flyability constraints;

querying a flight data source, based at least on the received set of flight adaptation parameters for the aircraft flight descent time period and aircraft flight descent airspace region, and retrieving flight information therefrom including any of the following:

winds and temperatures aloft data for the aircraft flight descent time period and the aircraft flight descent airspace region;

airspace/navigation constraints for the aircraft flight descent time period and the aircraft flight descent airspace region;

airspace traffic demand corresponding to the aircraft flight descent time period and the aircraft flight descent airspace region; and airspace arrival delay model corresponding to the aircraft flight descent time period and the aircraft flight descent airspace region; and calculating and constructing a set of candidate descent profiles, based on the retrieved flight information and the set of flight adaptation parameters, the calculating and constructing performed at a location physically separate from the particular aircraft, where for each candidate in the set of candidate descent profiles constructing a four dimensional trajectory defined by position, altitude, and time, for the particular aircraft, the aircraft flight descent time period, and the aircraft flight descent airspace region, each candidate descent profile comprising:

a descent profile value defined by at least one of a flight path angle and a descent rate for the particular aircraft, the descent profile value being within a range of values from a minimum descent profile value to a maximum descent profile value; and an aggregated total fuel consumption value for the particular aircraft following the calculated trajectory for the candidate descent profile, based on an aircraft performance model for the particular aircraft and the descent profile value for the candidate descent profile; and a flyability constraints metric for the calculated trajectory for the candidate descent profile; and selecting a best candidate descent profile from the set of candidate descent profiles, the best candidate descent profile having the least fuel consumption value while the flyability constraints metric for the descent profile remains within the aircraft flight descent flyability constraints.

* * * * *